United States Patent
Sengupta et al.

(10) Patent No.: US 11,281,542 B2
(45) Date of Patent: Mar. 22, 2022

(54) SYSTEM AND METHOD FOR BACKUP GENERATION FOR DEPLOYMENTS

(71) Applicant: EMC IP Holding Company LLC, Hopkinton, MA (US)

(72) Inventors: Sonali Sengupta, Bangalore (IN); Amarendra Behera, Bangalore (IN); Sunil Yadav, Bangalore (IN); Shelesh Chopra, Bangalore (IN); Sapna Chauhan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 102 days.

(21) Appl. No.: 16/656,982

(22) Filed: Oct. 18, 2019

(65) Prior Publication Data

US 2021/0117285 A1   Apr. 22, 2021

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01); *G06F 11/1469* (2013.01)

(58) Field of Classification Search
CPC ............ G06F 11/1464; G06F 11/1451; G06F 11/1461; G06F 11/1469
See application file for complete search history.

(56) References Cited

U.S. PATENT DOCUMENTS

| | | |
|---|---|---|
| 6,745,210 B1 | 6/2004 | Scanlan et al. |
| 8,554,918 B1 | 10/2013 | Douglis |
| 9,798,629 B1 | 10/2017 | Shilane et al. |
| 9,977,704 B1 | 5/2018 | Chopra et al. |
| 10,089,144 B1 | 10/2018 | Nagpal et al. |
| 10,102,080 B1 | 10/2018 | Gruszka et al. |
| 10,616,127 B1 | 4/2020 | Suit |
| 2007/0136541 A1* | 6/2007 | Herz ............... G06F 11/1464 711/162 |
| 2009/0271485 A1 | 10/2009 | Sawyer |
| 2013/0085995 A1 | 4/2013 | Mostachetti et al. |
| 2014/0279912 A1 | 9/2014 | Anglin |
| 2014/0279922 A1 | 9/2014 | Kottomtharayil |
| 2015/0096011 A1 | 4/2015 | Watt |
| 2016/0217384 A1 | 7/2016 | Leonard et al. |
| 2016/0306564 A1 | 10/2016 | Cheng et al. |
| 2016/0342403 A1 | 11/2016 | Zamir |
| 2017/0010941 A1 | 1/2017 | Shimada |
| 2017/0075765 A1* | 3/2017 | Chen ............... G06F 11/1469 |
| 2017/0132089 A1 | 5/2017 | Roehrsheim et al. |
| 2017/0300505 A1 | 10/2017 | Belmanu Sadananda et al. |
| 2017/0357550 A1 | 12/2017 | Jain |

(Continued)

*Primary Examiner* — Michelle T Bechtold
(74) *Attorney, Agent, or Firm* — Chamberlain, Hrdlicka, White, Williams & Aughtry

(57) ABSTRACT

A backup manager for providing backup services includes storage and a backup orchestrator. The storage stores manager associations. The backup orchestrator obtains a request to provide the backup services for a deployment; in response to the request: identifies types of managers of the deployment; makes a determination, based on the types of the managers of the deployment, that the managers of the deployment require a hybrid backup using the manager associations; and schedules a hybrid backup for the deployment based on the determination.

17 Claims, 10 Drawing Sheets

(56) References Cited

U.S. PATENT DOCUMENTS

| | | |
|---|---|---|
| 2017/0364415 A1 | 12/2017 | Formato et al. |
| 2018/0095816 A1 | 4/2018 | Fang et al. |
| 2018/0314457 A1 | 11/2018 | Bender et al. |
| 2019/0278661 A1 | 9/2019 | Mehta et al. |
| 2019/0278663 A1 | 9/2019 | Mehta et al. |
| 2020/0019319 A1 | 1/2020 | Cheng et al. |
| 2020/0019470 A1 | 1/2020 | Wolfson et al. |
| 2020/0264919 A1 | 8/2020 | Vukovic |
| 2020/0334199 A1 | 10/2020 | Wolfson et al. |
| 2020/0364112 A1 | 11/2020 | Mehta et al. |
| 2020/0387321 A1 | 12/2020 | Bansal et al. |

* cited by examiner

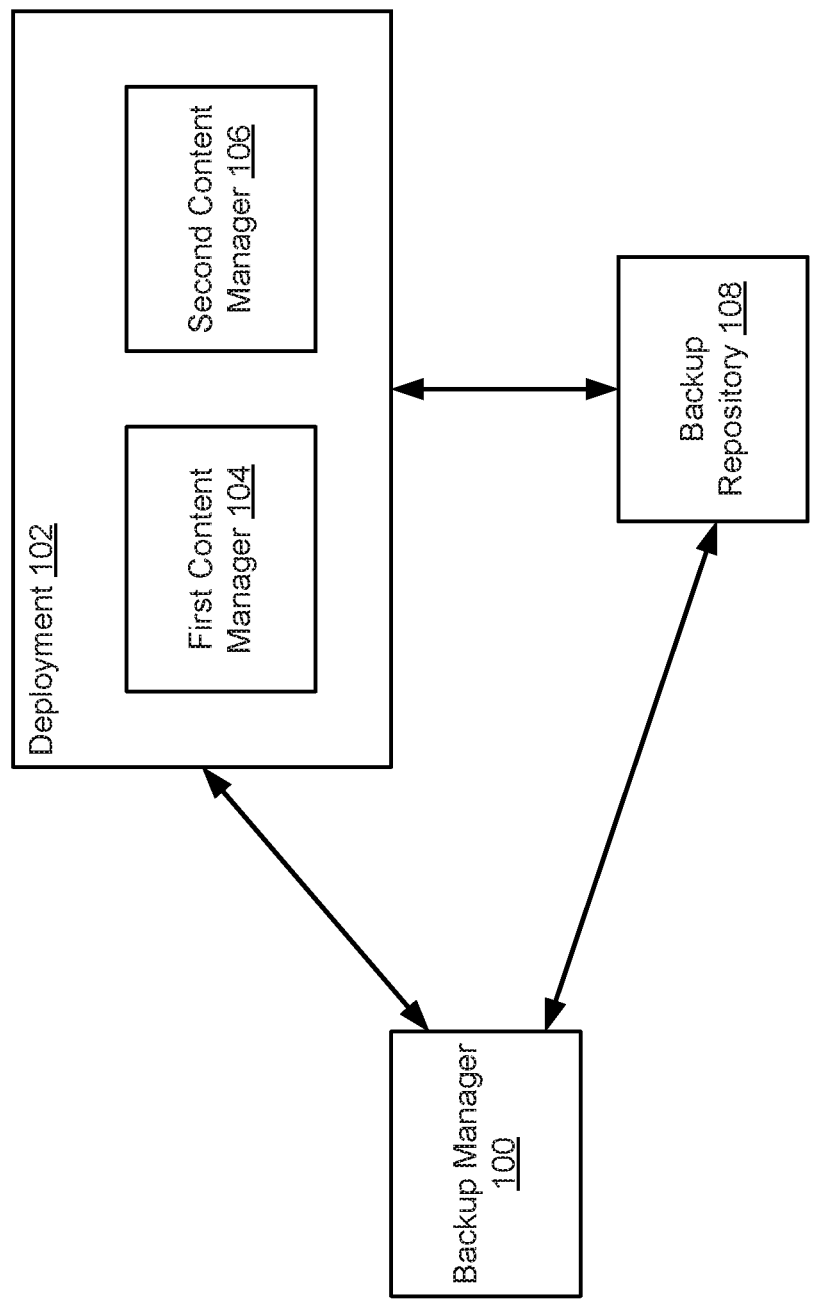
FIG. 1.1

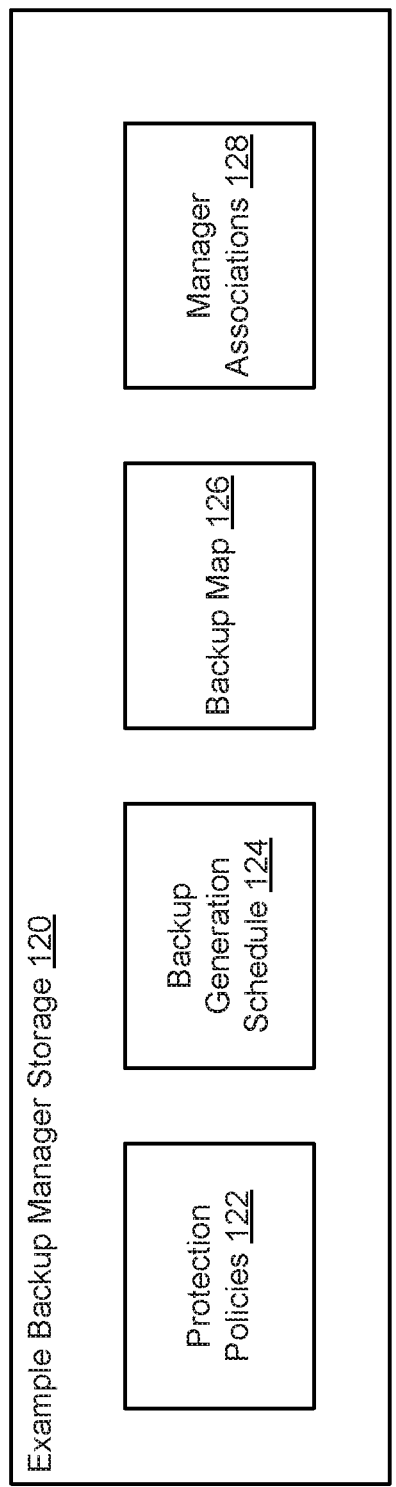
FIG. 1.2

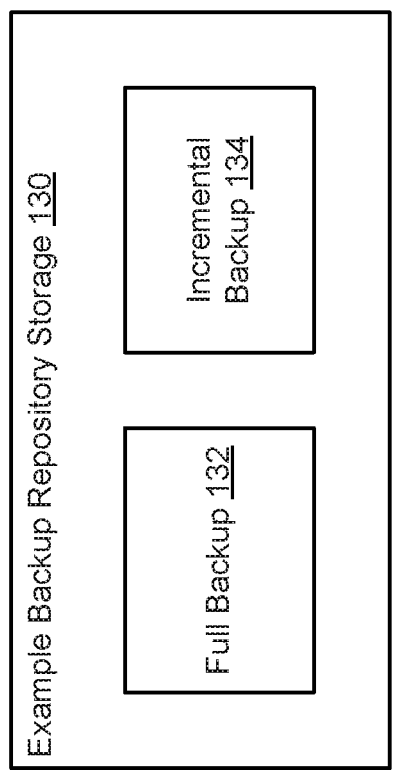
FIG. 1.3

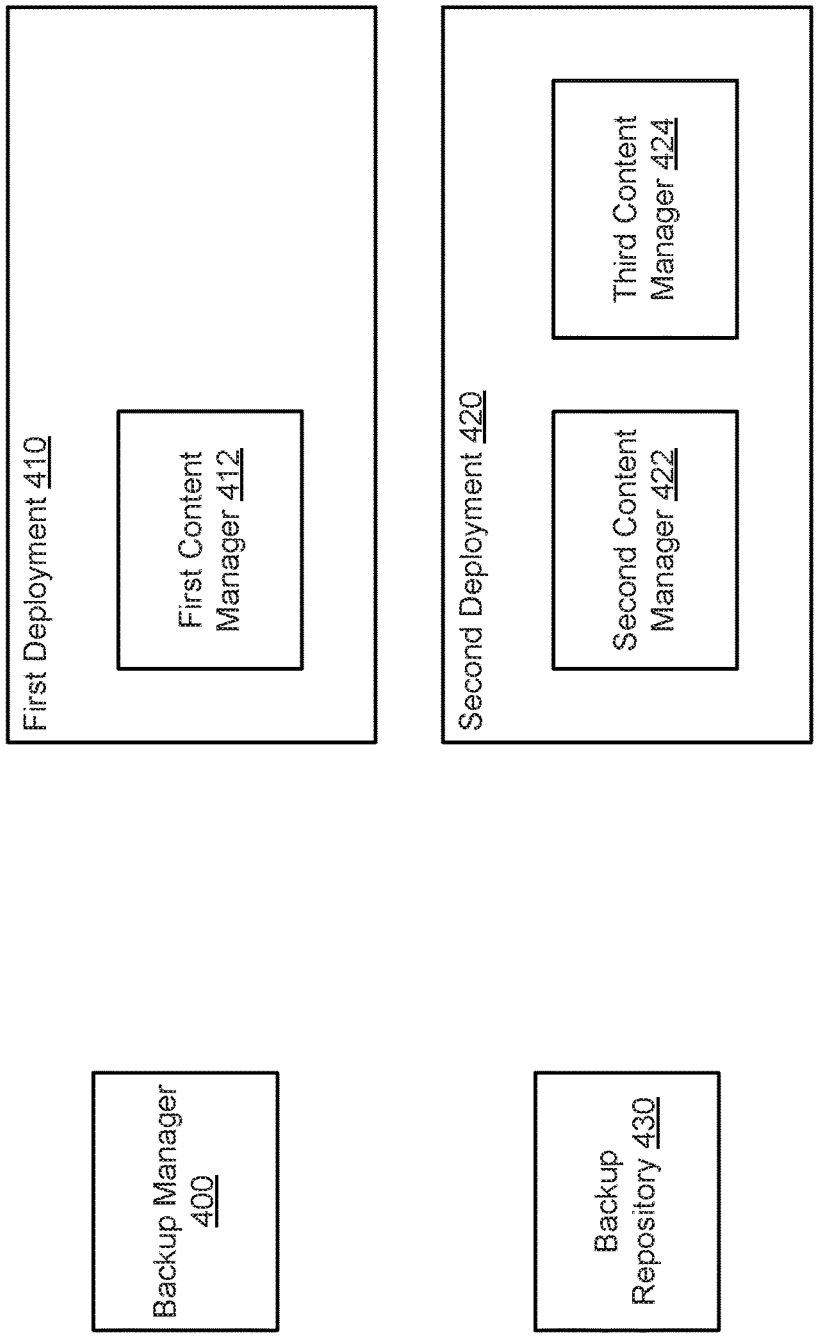
FIG. 4.1

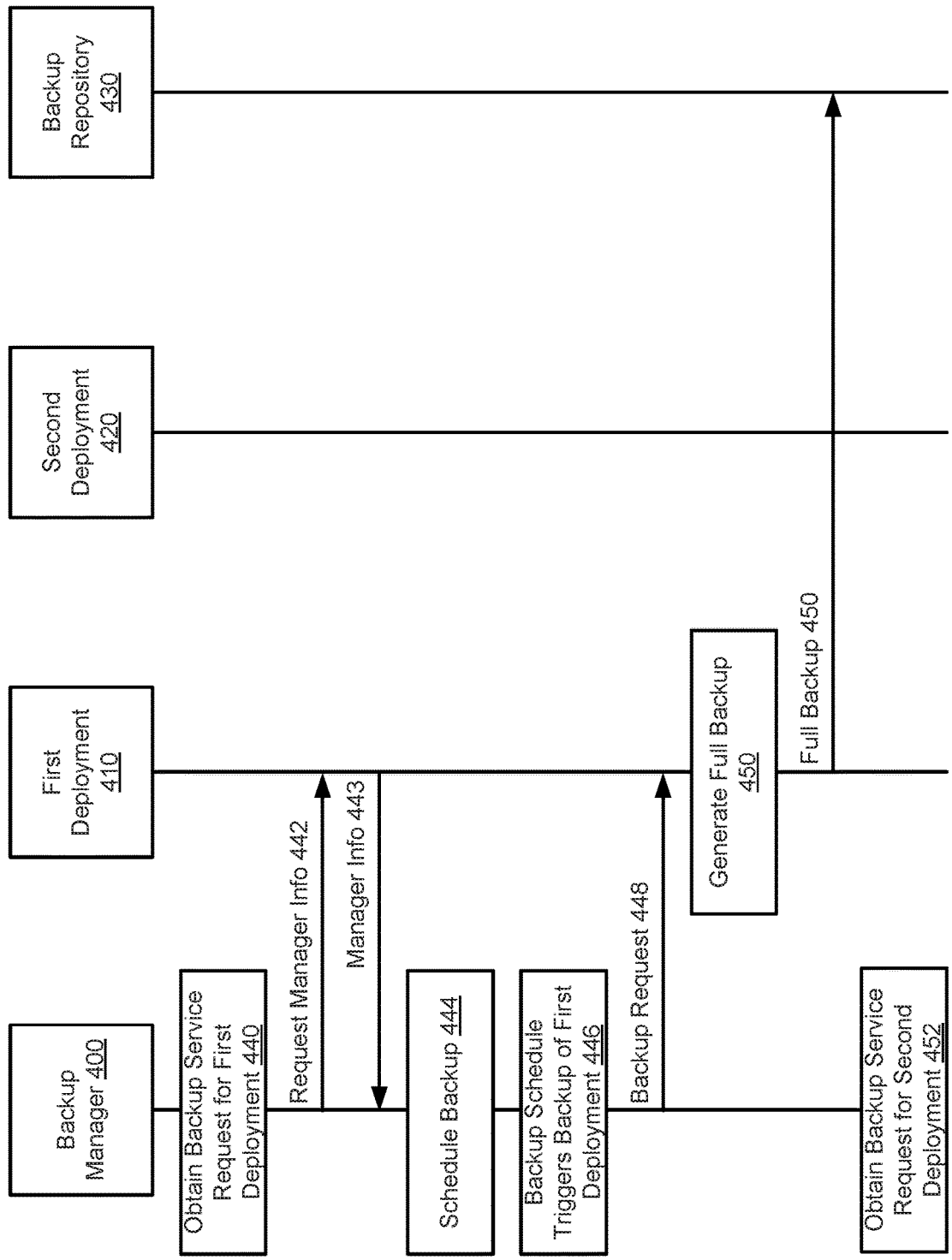
FIG. 4.2

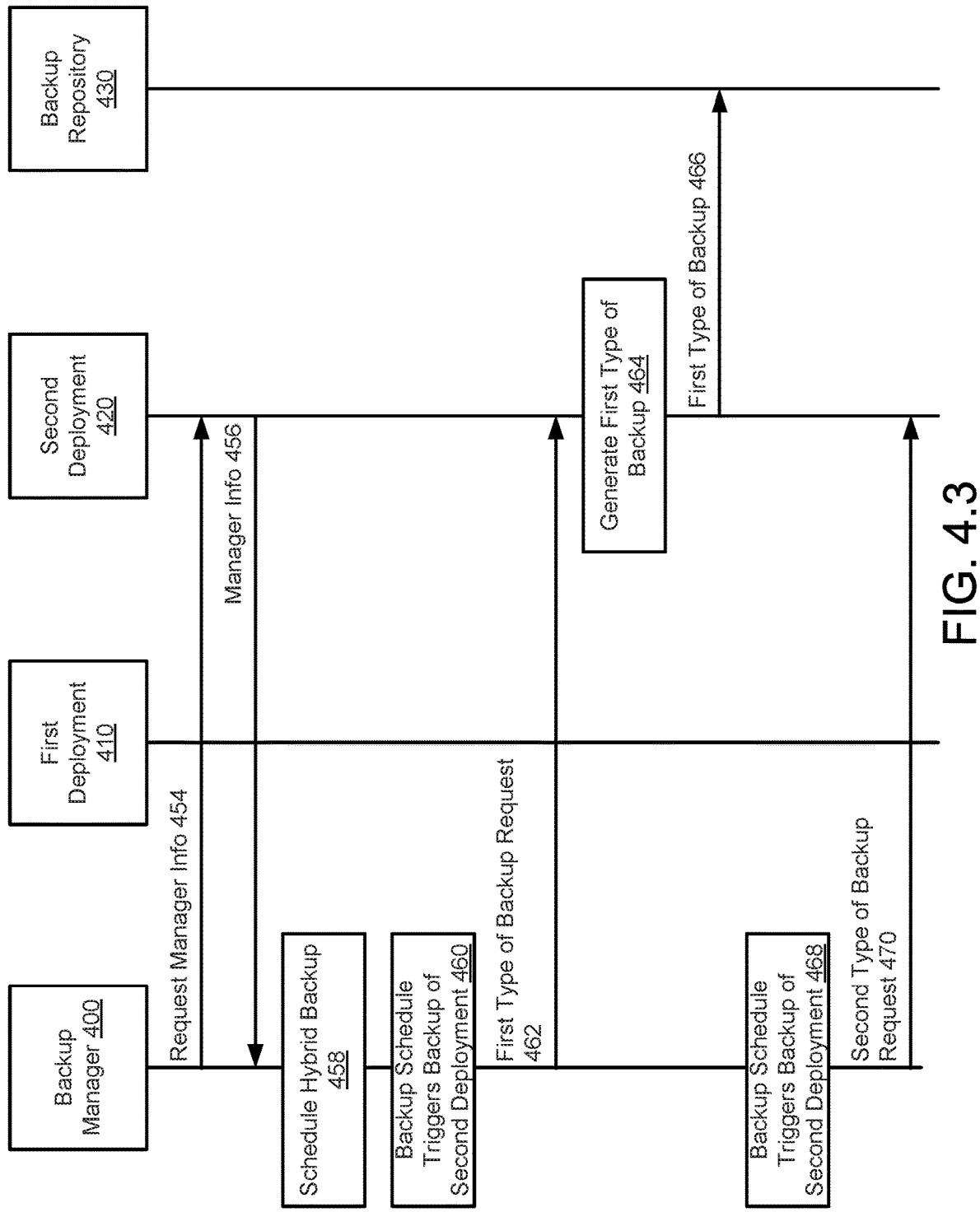
FIG. 4.3

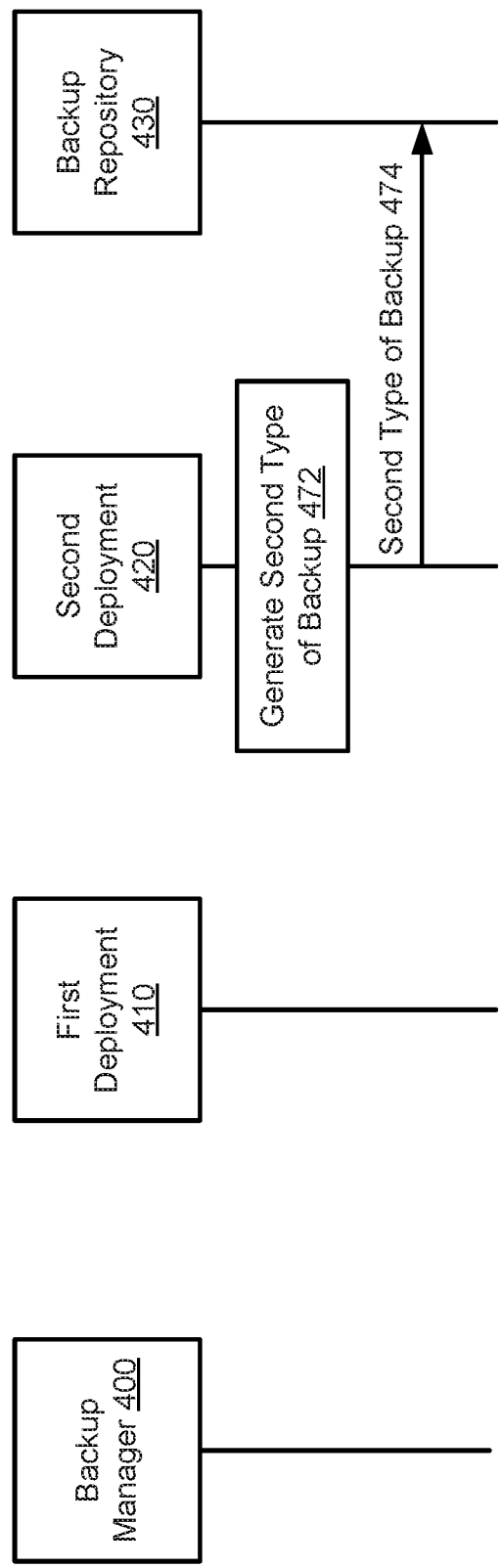
FIG. 4.4

SYSTEM AND METHOD FOR BACKUP GENERATION FOR DEPLOYMENTS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for providing backup services in accordance with one or more embodiments of the invention includes storage and a backup orchestrator. The storage stores manager associations. The backup orchestrator obtains a request to provide the backup services for a deployment; in response to the request: identifies types of managers of the deployment; makes a determination, based on the types of the managers of the deployment, that the managers of the deployment require a hybrid backup using the manager associations; and schedules a hybrid backup for the deployment based on the determination.

In one aspect, a method for providing backup services in accordance with one or more embodiments of the invention includes obtaining a request to provide the backup services for a deployment; in response to the request: identifying type of managers of the deployment; making a determination, based on the types of the managers of the deployment, that the managers of the deployment require a hybrid backup; and scheduling a hybrid backup for the deployment based on the determination.

In one aspect, a non-transitory computer readable medium in accordance with one or more embodiments of the invention includes computer readable program code, which when executed by a computer processor enables the computer processor to perform a method for providing backup services, the method includes obtaining a request to provide the backup services for a deployment; in response to the request: identifying type of managers of the deployment; making a determination, based on the types of the managers of the deployment, that the managers of the deployment require a hybrid backup; and scheduling a hybrid backup for the deployment based on the determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example backup manager storage in accordance with one or more embodiments of the invention.

FIG. 1.3 shows a diagram of an example backup repository storage in accordance with one or more embodiments of the invention.

FIG. 4.1 shows a diagram of an example system.

FIGS. 4.2-4.4 show diagrams of interactions between and actions performed by components of the example system of FIG. 4.1 over time.

DETAILED DESCRIPTION

Figure 2:
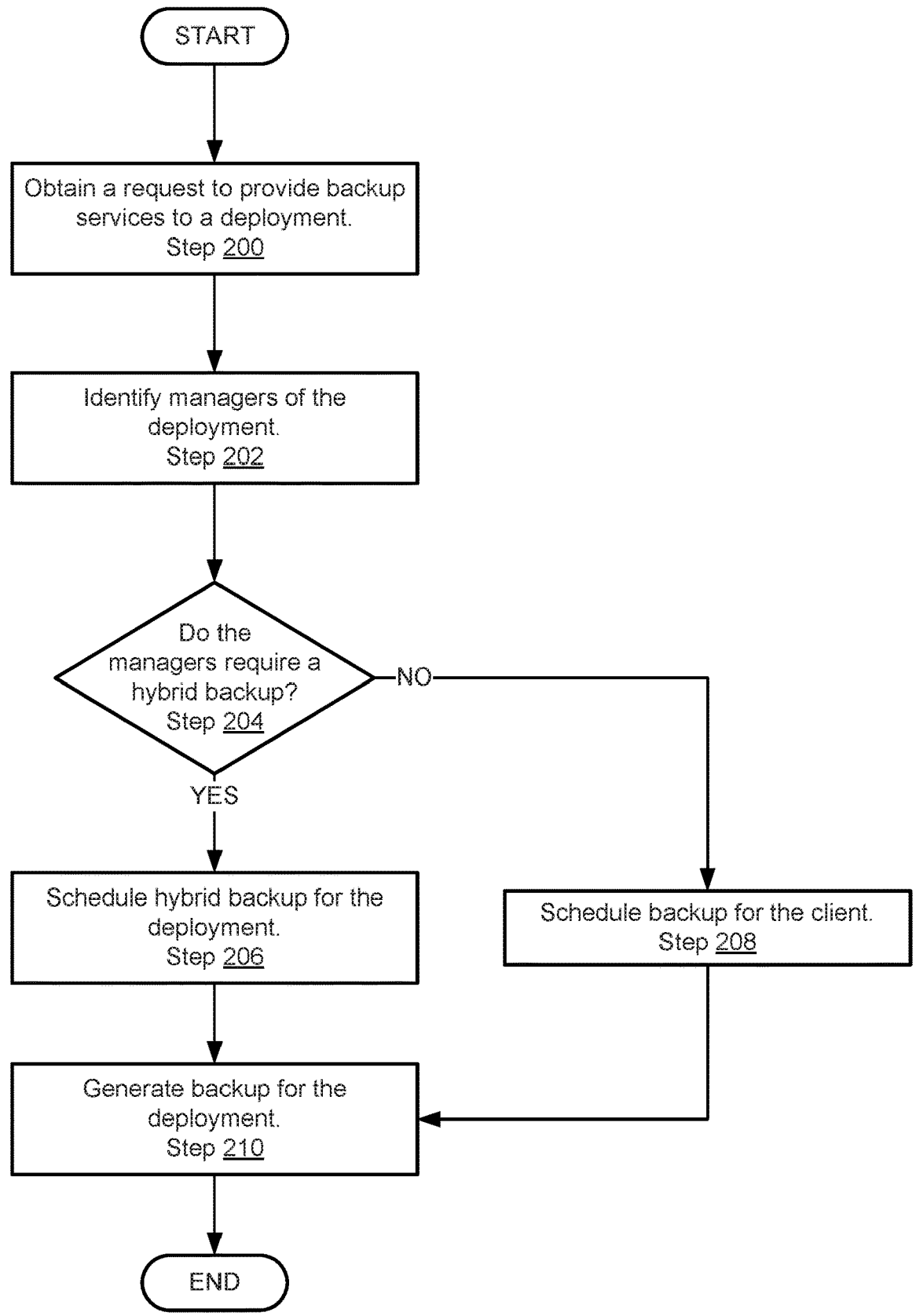
FIG. 2 shows a flowchart of a method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients or other types of devices. Backup services may include generating backups of the clients, storing the backups, and using the backups to restore clients to previous states.

Embodiments of the invention may provide a method for generating and storing backups that conserves computational resources. The method may select the manner in which backups are generated based on the types of entities that are available to generate backups. By taking into account of the types of entities that are available for backup generation purposes, lower computational cost backups may be preferentially generated over higher computational cost backups. By doing so, computing resources of the system may be conserved which may result in a system that is more computationally efficient, able to perform other functionality more quickly, and/or improves a user experience by reducing the likelihood of unexpected behavior of the system caused by lack of computing resources (e.g., out of memory/storage/processor availability states).

FIG. 1.1 shows a system in accordance with one or more embodiments of the invention. The system may include a deployment (102) that utilizes backup services provided by the backup manager (100). The backup services may include (i) generation of backups of the deployment (102), storing the backups in a backup repository (108), and/or utilizing backups of the deployment (102) stored in the backup repository (108) to restore the deployment (102). Restoring the deployment (102) may place the state of the deployment (102) into a state associated with the backups used to perform the restoration.

For example, backups of the deployment (102) may include data reflecting the state of the deployment (102) at a point of time (e.g., a full backup) and/or changes in the state of the deployment (102) over a period of time (e.g., an incremental backup). The backups may be used to change the data of the deployment (102) to reflect the data of the repository at periods of time associated with backups. Once changed, the state of the deployment (102) may be similar to the state of the deployment when the backups were generated.

Each of the components of the system may be operably connected to each other and/or other entities not shown using any combination and quantity of wired and/or wireless networks. Each component of the system is discussed below.

The deployment (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The deployment (102) may be implemented using other types of computing devices without departing from the invention. For additional details regarding computing devices, refer to FIG. 5.

The deployment (102) may be implemented using logical devices without departing from the invention. For example, the deployment (102) may be implemented using virtual machines that utilize computing resources of any number of physical computing devices to provide the functionality of the deployment (102). The deployment (102) may be implemented using other types of logical devices without departing from the invention.

In one or more embodiments of the invention, the deployment (102) may provide computer implemented services. A computer implemented service may be, for example, managing of a data base.

When providing computer implemented services, the deployment (102) may generate and store data upon which the deployment (102) utilizes to provide the computer implemented services. The deployment (102) may include any number of manager (e.g., first content manager (104), second content manager (106)) that manage different portions of the data utilized by the deployment (102) when providing computer implemented services.

The content managers (e.g., 104, 106) may be, for example, database managers or other types of logical entities that manage different portions of deployment data. Such managers may be natively capable of generating backups for the respective portions of the deployment data. However, such managers may be limited in their abilities to generate different types of backups (e.g., full backups, incremental backups, etc.).

For example, when the native backup generation functionality of the first content manager (104) is invoked, only a first type of backup (e.g., a full backup) may be generated. In contrast, when the native backup generation functionality of the second content manager (106) is invoked, only a second type of backup may be generated (e.g., an incremental backup).

Different types of backups may require different quantities of computing resources to be generated and/or stored. For example, full backups may require substantially more computing resource for generation than incremental backups.

Embodiments of the invention may provide a method for providing backups services that detects the types of available content managers and orchestrates generation of backups for deployments based on the types of available content managers. By doing so, the computational cost for generating and/or storing backups may be reduced by selecting types of backups to generate while meeting data protection policy requirements.

While the deployment (102) is illustrated in FIG. 1.1 as including two content managers, the deployment (102) may include any number of content managers without departing from the invention. Additionally, the deployment (102) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the deployment (102) and/or other entities. Providing backup services may include (i) generating backups for the deployment (102), (ii) storing the backups in the backup repository (108), and/or (iii) restoring the deployment (102) using backups of the deployment (102) stored in the backup repository (108).

When generating backups for the deployment (102), the backup manager (100) may take into account the types of managers (e.g., 104, 106) hosted by the deployment. The backup manager (100) may determine when and how to invoke the native backup generation functionality of the content managers to meet data protection policy requirements (e.g., level of required protection for the deployment). Additionally, the backup manager (100) may take into account the computational cost for invoking the native backup generation functionality of the content managers to reduce the computational cost of generating backups while meeting the protection policy requirements. For additional details regarding protection policies, refer to FIG. 1.2.

Once the backup manager (100) determines how and when to invoke the native backup generation functionality of the content manager, the backup manager (100) may generate and/or update a backup generation schedule. The backup generation schedule may specify when and how backups are to be generated for any number of entities. The backup generation schedule may also specify other information regarding generation and management of backups. For additional details regarding protection policies, refer to FIG. 1.2.

To provide its functionality, the backup manager (100) may include an orchestrator (e.g., a backup orchestrator) that provides the above noted functionality of the backup manager and/or includes functionality to send messages to entities hosted by the deployment (102) to invoke functionality of the deployment (102). For example, the deployment (102) may host a remote agent (not shown) that services requests from the backup manager (100). The agent may, upon receipt of such requests, invoke functionality of the deployment (102).

The backup orchestrator may be implemented using physical devices (e.g., processors, application specific integrated circuits, programmable gate arrays, etc.) and/or logical devices (e.g., computer instructions stored on persistent storage that when executed by a processor gives rise to the functionality of the backup orchestrator).

The backup repository (108) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup repository (108) may be implemented using other types of computing devices without departing from the invention. For additional details regarding computing devices, refer to FIG. 5.

The backup repository (108) may be implemented using logical devices without departing from the invention. For example, the backup repository (108) may be implemented using virtual machines that utilize computing resources of any number of physical computing devices to provide the functionality of the backup repository (108). The backup repository (108) may be implemented using other types of logical devices without departing from the invention.

In one or more embodiments of the invention, the backup repository (108) provides data storage services to the deployment (102) and/or other entities. Data storage services may include storing data and providing copies of previously stored data. For example, backups of the deployment and/or other entities may be stored in the backup repository (108) for storage. For additional details regarding storing data in the backup repository (108), refer to FIG. 1.3.

While the system of FIG. 1.1 has been illustrated as including a limited number of specific components, a system in accordance with embodiments of the invention may include additional, fewer, and/or different components without departing from the invention.

As discussed above, the backup manager (100) and the backup repository (108) may store information that may be used when providing their respective functionalities. To further clarify aspects of stored information, diagrams of examples of storages of the backup manager (100) and the backup repository (108) are illustrated in FIGS. 1.2 and 1.3, respectively.

Turning to FIG. 1.2, FIG. 1.2 shows a diagram of an example backup manager storage (120) in accordance with embodiments of the invention.

In one or more embodiments of the invention, the example backup manager storage (120) is implemented using devices that provide data storage services (e.g., storing data and providing copies of previously stored data). The devices that provide data storage services may include hardware devices and/or logical devices. For example, the example backup manager storage (120) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the example backup manager storage (120) may include a memory device (e.g., a dual in line memory device) in which data is stored and from which copies of previously stored data are provided. In another example, the example backup manager storage (120) may include a persistent storage device (e.g., a solid state disk drive) in which data is stored and from which copies of previously stored data is provided. In a still further example, the example backup manager storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example backup manager storage (120) may store data structures including protection policies (122), a backup generation schedule (124), a backup map (126), and manager associations (128). Each of these data structures is discussed below.

The protection policies (122) may be a data structure that includes information regarding goals for data protection of entities. The goals may specify the amount, type, and/or quality of data protection services to be provided to respective entities. The protection policies (122) may specify, for example, a level of redundancy for backups, a retention time for backups, and/or other characteristics that specify the level of data protection to be provided to entities.

The backup generation schedule (124) may be a data structure that includes information that specifies when, where, and how backups are to be generated and/or managed after generation. The backup generation schedule (124) may be generated based on, at least in part, the backup generation schedule (124). The backup generation schedule (124) may also be based on, for example, the computational cost of generating different type of backups to minimize the computational cost of generating backups while meeting the protection policies.

The backup generation schedule (124) may be used, for example, to trigger when to send backup generation requests to entities. For example, the backup generation schedule (124) may specify when and how to generate backups.

The backup map (126) may be a data structure that includes information regarding the types of backups stored in backup storage and associations with corresponding entities for which the backups were generated.

The manager associations (128) may be one or more data structures that include information regarding the backup capabilities of content managers of deployments. For example, the manager associations (128) may specify the types of backups that may be generated by each of the content managers of a deployment. The aforementioned information may be used when generating the backup generation schedule (124).

For example, future generations of backups using different types of content managers may be added to the backup generation schedule (124) to meeting the requirements of the protection policies (122) while reducing the computational cost of generating/storing backups.

While the example backup manager storage (120) has been illustrated as including data structures including a limited amount of specific information, any of the data structures stored in the example backup manager storage (120) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from the embodiments of the invention. Any of the aforementioned data structures may be implemented using, for example, lists, tables, linked lists, databases, and/or other types of data structures.

Turning to FIG. 1.3, FIG. 1.3 shows a diagram of an example backup repository storage (130) in accordance with embodiments of the invention.

In one or more embodiments of the invention, the example backup repository storage (130) is implemented using devices that provide data storage services (e.g., storing data and providing copies of previously stored data). The devices that provide data storage services may include hardware devices and/or logical devices. For example, the example backup repository storage (130) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the example backup repository storage (130) may include a memory device (e.g., a dual in line memory device) in which data is stored and from which copies of previously stored data are provided. In another example, the example backup repository storage (130) may include a persistent storage device (e.g., a solid state disk drive) in which data is stored and from which copies of previously stored data is provided. In a still further example, the example backup repository storage (130) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

As discussed above, a backup repository may store any number of backups associated with any number of entities. The backup repository may store different types of backups. In this example, example backup repository storage (130) may store data structures including a full backup (132) and an incremental backup (134). Each of these data structures is discussed below.

The full backup (132) may be a data structure that includes information reflecting all, or a portion, of the data of an entity at a point in time. For example, the full backup (132) may be a copy of a portion of data of the entity stored in persistent storage at a point in time. The full backup (132) may be used to restore the associated entity to a state of the entity at the point in time for which the full backup (132) was generated.

The incremental backup (134) may be a data structure that includes information reflecting all, or a portion, of changes to the data of an entity made over a period of time. For example, the incremental backup (134) may specify any number of changes (e.g., modifications, deletions) made to the portion of the entity for the period of time (e.g., one hour, one day, one week, etc.). The incremental backup (134) may be used in combination with at least one full backup to restore the associated entity to a state of the entity.

For example, the incremental backup (134) may be used to modify a full backup associated with a point in time to reflect the data of the entity at a second point in time associated with the incremental backup (134). However, the period of time associated with the incremental backup (134) may need to match with the point in time.

For example, if a full backup is associated with a first point in time, an incremental backup may need to reflect changes starting at the first point in time. However, multiple incremental backups may be used in combination with a full backup to restore an entity to other periods of time (e.g., utilizing a full backup associated with a first point in time, a first incremental backup associated with a period of time from the first point in time a second point in time, and a second incremental backup associated with a period of time from the second point in time to a third point in time; the aforementioned relationship may be referred to as chaining backups to perform a restoration. Any number of backups may be chained to perform restorations to the points in time demarcating the beginning/ends of periods of time associated with incremental backups).

While the example backup repository storage (130) is illustrated as only including two backups, a backup repository storage in accordance with one or more embodiments of the invention may include any number of backups.

While the example backup repository storage (130) has been illustrated as including data structures including a limited amount of specific information, any of the data structures stored in the example backup repository storage (130) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from the embodiments of the invention. Any of the aforementioned data structures may be implemented using, for example, lists, tables, linked lists, databases, and/or other types of data structures.

Figure 3:
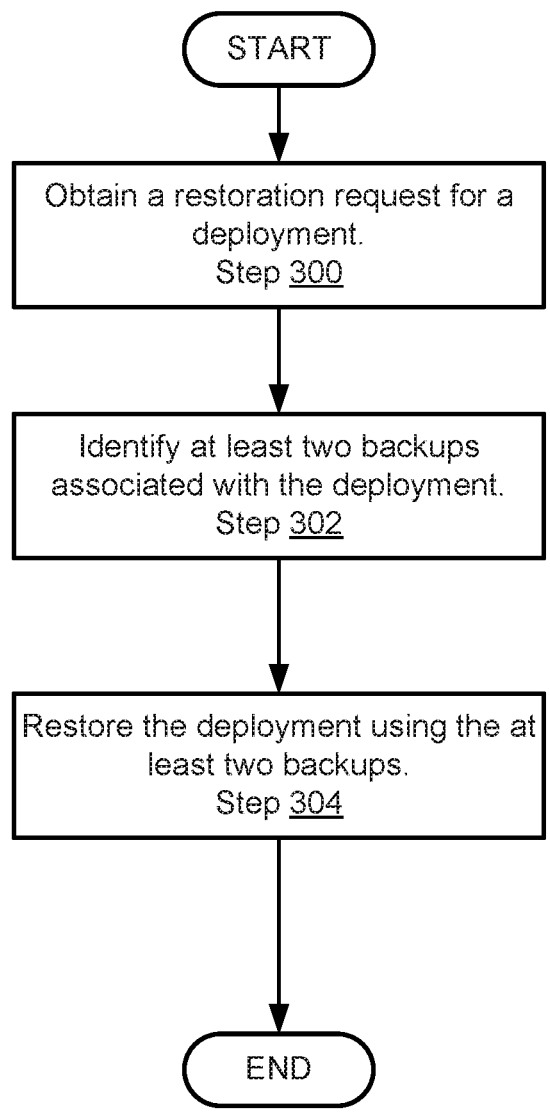
FIG. 3 shows a flowchart of a method of providing restoration services in accordance with one or more embodiments of the invention.

As discussed above, a backup manager in accordance with embodiments of the invention may provide backup services. FIGS. 2-3 show methods that may be performed by a backup manager when providing backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, the manager (e.g., 130, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a request to provide backup services to a deployment is obtained.

The request may be obtained from, for example, the deployment, an administrator, or another type of entity. The request may be obtained from a message sent by a requesting entity. The message may specify that backup services are to be provided to the deployment.

In one or more embodiments of the invention, the request prompts action. For example, steps 202-210 may be performed in response to obtaining the request.

In step 202, managers of the deployment are identified. The managers may be, for example, content managers as described with respect to FIG. 1.1.

In one or more embodiments of the invention, the identities of the managers are obtained from the deployment. For example, a request may be sent to the deployment as part of a message. In response, the deployment may provide the identities of managers that manage portions of the deployment's data.

In Step 204, it is determined whether the managers require a hybrid backup.

The determination may be made by identifying the types of backups that each manager is able to generate. As discussed above, some managers may be unable to generate one or more types of backups. For example, some managers may be unable to generate incremental backups.

The type of backups that each manager may be able to generate may be determined using manager associations. As discussed above, the manager associations may indicate the types of backups that each manager is able to generate.

If any of the managers are unable to generate incremental backups, it may be determined that a hybrid backup is required.

If it is determined that a hybrid backup is required, the method may proceed to step 206. If it is determined that a hybrid backup is not required, the method may proceed to step 208.

In Step 206, a hybrid backup for the deployment is scheduled.

In one or more embodiments of the invention, a hybrid backup is scheduling generation of a first type of backup for a first portion of the deployment data using a first content manager at a first point in time and scheduling generation of a second type of backup for a second portion of the deployment data using a second content manager at a second point in time. The second point in time may be after the first point in time. The first backup may be a full backup. The second backup may be an incremental backup. The second portion of data may be a sub-portion of the first portion of data.

For example, the first manager may be a manager associated with multiple databases. The first manager may only be capable of generating full backups. The second manager may be a manager associated with one of the multiple databases. The second manager may be capable of generating both full backups and incremental backups. If only the functionality of the first manager was used, only full backups for all of the databases may be generated. While doing so may meet data protection requirements, the computational cost to do so may be high. In contrast, invoking the functionality of the second manager may be used to generate incremental backups that may be used in combination with a previously generated full backup. The computational cost for generating the incremental backup may be substantially less than the computational cost for generating a full backup. Consequently, the computational cost for meeting the protection policies may be reduced when compared to only generating multiple full backups.

The hybrid backup for the deployment may be scheduled by adding information reflecting the hybrid backup to a backup generation schedule. For example, information may be added to the backup generation schedule reflecting generation of the first type of backup and the second type of backup. The information may also reflect that the second type of backup is generated after generation of the first type of backup.

In step 210, a backup for the deployment is generated.

In one or more embodiments of the invention, if a hybrid backup has been scheduled, generating the backup for the deployment includes generating a full backup by invoking the functionality of a first manager and generating an incremental backup by invoking the functionality of a second manager of the deployment. The aforementioned invocations may be made by sending messages to an agent hosted by the deployment. In turn, the agent may invoke the native backup generation functionality of the managers at points in time corresponding to points in time specified by the backup generation schedule. By doing so, a full and incremental backup may be generated using different managers.

In one or more embodiments of the invention, if a hybrid backup has not been schedule, generating the backup for the deployment includes generating a full backup by invoking the functionality of a manager and generating an incremental backup by invoking the functionality of the manager at a later point in time. By doing so, a full and incremental backup may be generated by the same manager.

The generated backups may be stored in a backup repository for future use.

The method may end following Step 206.

Returning to step 204, the method may proceed to step 208 following step 204 if it is determined that a hybrid backup is not required.

In step 208, a backup for the client is scheduled.

In one or more embodiments of the invention, a backup is scheduling generation of a first type of backup for a first portion of the deployment data using a content manager at a first point in time and scheduling generation of a second type of backup for the first portion of the deployment data using the same content manager at a second point in time. The second point in time may be after the first point in time. The first backup may be a full backup. The second backup may be an incremental backup. As discussed with respect to step 206, the backup may be scheduled by adding information to a backup generation schedule.

The points in time for generation of the backups in steps 206 and 208 may be selected based on protection policies.

For example, a protection policy may specify an amount of time during which a deployment may be unprotected (e.g., 1 hour). The points in time may be selected so that backups are generated at points in time to meet the requirements of the protection policies (e.g., generating an incremental backup 1 hour after generating a full backup and subsequently generating incremental backups every 1 hour when a protection policy specifies a maximum amount of unprotected time as 1 hour.

The method may proceed to step 210 following step 208.

Using the method illustrated in FIG. 2, a system in accordance with embodiments of the invention may generate backups in a manner that both meets protection policy requirements while conserving use of computational resources for generation and storage of the backups.

Turning to FIG. 3, FIG. 3 shows a flowchart of a method in accordance with one or more embodiments of the invention. The method depicted in FIG. 3 may be used to provide restoration services in accordance with one or more embodiments of the invention. The method shown in FIG. 3 may be performed by, for example, the manager (e.g., 130, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a restoration request for a deployment is obtained. The restoration request may be obtained, for example, from the deployment, an administrator, or another entity. The request may be included in a message from the requesting entity.

In step 302, at least two backups associated with the deployment are identified.

The at least two backups associated with the deployment may be identified based on a point in time to which the deployment is to be restored. The point in time may be used to identify the at least two backups based on the points in times to which the at least two backups may be used to restore the deployment (e.g., match the points in time).

A first of the at least two backups may be a full backup. A second of the at least two backups may be an incremental backup. The incremental backup may be associated with the point in time to which the deployment is to be restored (e.g., reflect changes to the deployment data leading up to the point in time). The full backup may be associated with a second point in time that is earlier than the point in time associated with the incremental backup. The at least two backups may include additional incremental backups (e.g., to span a period of time between the second point in time and a third point in time that demarcates the earliest point in time at which the incremental backup reflects changes to the state of the deployment).

In step 304, the deployment is restored using the at least two backups.

In one or more embodiments of the invention, the deployment is restored by copying the at least two backups (or a data structure reflecting the at least two backups) to the deployment and modifying the deployment data to reflect the data included in the at least two backups. For example, an incremental backup of the at least to backups may be used to modify a full backup of the at least two backups (e.g., apply the changes specified by the incremental backup to the full backup) and the modified full backup may be used to modify the deployment data (e.g., overwrite). By doing so, the deployment may be placed into a previous state associated with the at least two backups.

The method may end following step 304.

Using the method illustrated in FIG. 304, a deployment may be restored to a previous state. The deployment may have been backed up using a hybrid backup prior to performing a restoration.

To further clarify embodiments of the invention, a non-limiting example is provided in FIGS. 4.1-4.4. FIG. 4.1 may illustrate a system similar to that illustrated in FIG. 1.1. FIGS. 4.2-4.4 may illustrate interactions between components and/or actions performed by the components of the system of FIG. 4.1 over time. For the sake of brevity, only a limited number of components of the system of FIG. 1.1 are illustrated in each of FIGS. 4.1-4.4.

EXAMPLE

Consider a scenario as illustrated in FIG. 4.1 where a backup manager (400) is providing backup services to a first deployment (410) and a second deployment (420). When providing backup services, the backup manager (400) may orchestrate storage of backups in a backup repository (430).

The first deployment (410) hosts a first content manager (412) that manages all of the data of the first deployment (410). The first content manager (412) is able to generate both full and incremental backups.

The second deployment (420) hosts a second content manager (422) that manages all of the data of the second deployment (420) and a third content manager (424) that managers a portion of the data of the second deployment (420). The second content manager (422) is only able to generate full backups. The third content manager (424) is able to generate both full backups and incremental backups.

Turning to FIGS. 4.2-4.4, the aforementioned figures illustrate interactions between select components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. FIG. 4.4 is a continuation of the diagram of FIG. 4.3. In other words, element 440 indicates the first interaction that occurs while element 470 indicates the last interaction that occurs.

Turning to FIG. 4.2, at a first point in time, the backup manager (400) obtains a backup service request for the first deployment (440). In response, the backup manager (400) sends a manager information request (442) to the first deployment. The manager information request (442) requests identifies of the managers of the first deployment (410).

In response to receiving the manager information request (442), the first deployment (410) provides manager information (443) to the backup manager (400) that specifies the identity of the first content manager.

In response to receiving the manager information (443), the backup manager (400) analyzes the manager information (443) and determines that the first content manager is not limited. Consequently, the backup manager (400) schedules a backup (444) generation for the deployment using only first content manager. Specifically, the backup manager (400) schedules generation of a full backup and an incremental backup using the first content manager. The backup manager (400) adds appropriate information to the backup generation schedule to schedule the backup generation.

After scheduling the backup, time progresses which results in the backup schedule triggering a backup of the first deployment (446). Specifically, generation of a full backup for the deployment is triggered.

In response to the triggering, a backup request (448) is sent to the first deployment (410). The backup request (448) requests that a full backup be generated using the first content manager.

In response to receiving the backup request (448), the first deployment generates a full backup (450). After generating the full backup (450), the full backup (450) is provided to the backup repository (430) for storage.

While not illustrated in FIG. 4.2, subsequent incremental backups are generated by the first deployment (410) in response to additional backup requests by invoking the backup generation functionality of the first content manager. Such incremental backups are also stored in the backup repository (430)

After the full backup (450) and incremental backups are stored in the backup repository (430), time progresses and the backup manager (400) obtains a backup service request for the second deployment (452).

Turning to FIG. 4.3, the backup manager (400) sends a request for manager information (454) to the second deployment (420) in response to obtaining the backup service request for the second deployment (452).

In response to receiving the request for manager information (454), the second deployment (420) provides manager information (456) to the backup manager (400) that specifies the identity of the second content manager and the third content manager.

In response to receiving the manager information (456), the backup manager (400) analyzes the manager information (456) and determines that the first content manager is not limited but that the second content manager is limited. Consequently, the backup manager (400) schedules a hybrid backup (458) generation for the second deployment (420) using both content managers. Specifically, the backup manager (400) schedules generation of a full backup using the second content manager and an incremental backup using the third content manager. The backup manager (400) adds appropriate information to the backup generation schedule to schedule the backup generation.

After scheduling the backup, time progresses which results in the backup schedule triggering a backup of the second deployment (460). Specifically, generation of a full backup for the deployment is triggered.

In response to the triggering, a first type of backup request (462) is sent to the second deployment (420). The first type of backup request (462) specifies that the backup functionality of the second content manager is to be invoked to generate a full backup.

In response to receiving the first type of backup request (462), the second deployment generates a first type of backup (464) by invoking the functionality of the second content manager. Specifically, a full backup is generated. After generating the first type of backup (464), the first type of backup (466) is provided to the backup repository (430) for storage.

After the first type of backup (466) is stored in the backup repository (430), time progresses which results in the backup schedule triggering a second backup of the second deployment (468). Specifically, generation of an incremental backup for the second deployment (420) is triggered.

In response to the second triggering, a second type of backup request (470) is sent to the second deployment (420). The second type of backup request (470) specifies that the backup functionality of the third content manager is to be invoked to generate an incremental backup.

Turning to FIG. 4.4, in response to receiving the second type of backup request (470), the second deployment generates a second type of backup (472) by invoking the functionality of the third content manager. Specifically, an incremental backup is generated that is associated with the period of time from when the first type of backup (464) was generated to when the second type of backup (472) is generated. After generating the second type of backup (472), the second type of backup (474) is provided to the backup repository (430) for storage.

End of Example

Thus, as illustrated in FIGS. 4.1-4.4, embodiments of the invention may provide a method for managing generation of backups in a system that includes different types of content managers having differing backup generation functionalities. By managing the generation of backups, the computational cost of generating backups may be reduced while meeting data protection requirements.

Figure 5:
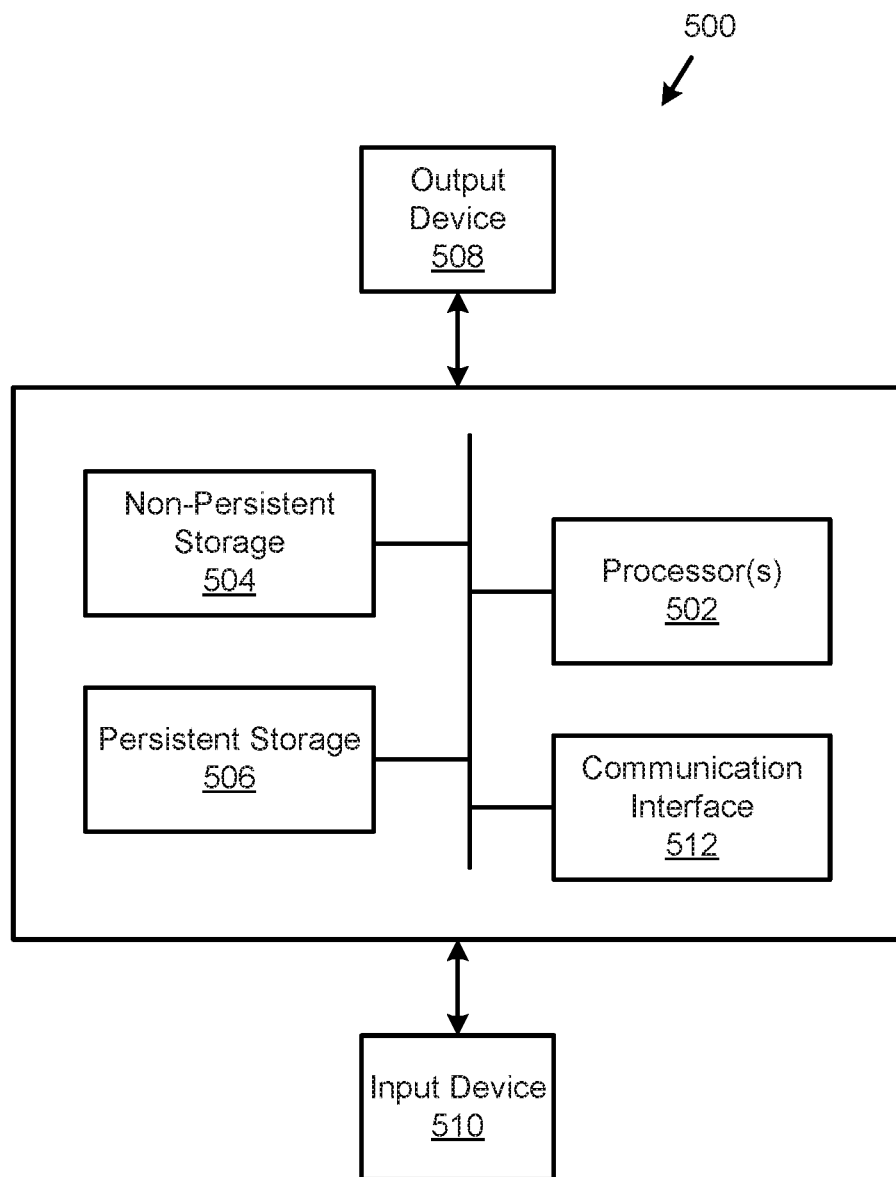
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for generating backups that meet data protection requirements while conserving computational resources. To do so, embodiments of the invention may provide a system in which the types of content managers that may be used to generate backups is taken into account for backup generation purposes. For example, the system may avoid use of content managers that generate computationally expensive backups. By doing so, content managers that generate computationally inexpensive backups may be generated to conserve computational resources of a system.

Thus, embodiments of the invention may address the problem of limited computational resource availability by decreasing the computational cost for generating and storing backups.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup manager for providing backup services, comprising:
   persistent storage for storing manager associations; and
   a computer processor programmed to:
     obtain a request to provide the backup services for a deployment;
     in response to the request:
       identify types of managers of the deployment, wherein the types of the managers specifies the types of backups that may be generated by each of the managers of the deployment;
       make a determination, based on the types of the managers of the deployment, that the managers of the deployment require a hybrid backup, using the manager associations;
       schedule a hybrid backup for the deployment based on the determination; and
       perform the hybrid backup to obtain:
         a first type of backup associated with a manager of the deployment; and
         a second type of backup associated with the manager of the deployment.

2. The backup manager of claim 1, wherein scheduling the hybrid backup for the deployment comprises:
   scheduling generation of the first type of backup for the managers at a first point in time; and
   scheduling generation of the second type of backup for the managers at a second point in time,
   wherein the second point in time is after the first point in time.

3. The backup manager of claim 1, wherein the first type of backup is a full backup.

4. The backup manager of claim 1, wherein the second type of backup is an incremental backup.

5. The backup manager of claim 1, wherein the first type of backup is based on all data of the deployment.

6. The backup manager of claim 1, wherein the second type of backup is based on a portion of data of the deployment.

7. A method for providing backup services, comprising:
   obtaining a request to provide the backup services for a deployment;
   in response to the request:
     identifying types of managers of the deployment, wherein the types of the managers specifies the types of backups that may be generated by each of the managers of the deployment;
     making a determination, based on the types of the managers of the deployment, that the managers of the deployment require a hybrid backup;
     scheduling a hybrid backup for the deployment based on the determination; and
     performing the hybrid backup to obtain:
       a first type of backup associated with a manager of the deployment; and
       a second type of backup associated with the manager of the deployment.

8. The method of claim 7, wherein scheduling the hybrid backup for the deployment comprises:
   scheduling generation of the first type of backup for the managers at a first point in time; and
   scheduling generation of the second type of backup for the managers at a second point in time,
   wherein the second point in time is after the first point in time.

9. The method of claim 7, wherein the first type of backup is a full backup.

10. The method of claim 7, wherein the second e of backup is an incremental backup.

11. The method of claim 7, wherein the first type of backup is based on all data of the deployment.

12. The method of claim 7, wherein the second e of backup is based on a portion of data of the deployment.

13. A non-transitory computer readable medium comprising computer readable program code, which when executed by a computer processor enables the computer processor to perform a method for providing backup services, the method comprising:
   obtaining a request to provide the backup services for a deployment;
   in response to the request:
     identifying types of managers of the deployment, wherein the types of the managers specifies the types of backups that may be generated by each of the managers of the deployment;
     making a determination, based on the types of the managers of the deployment, that the managers of the deployment require a hybrid backup;
     scheduling a hybrid backup for the deployment based on the determination; and
     performing the hybrid backup to obtain:
       a first type of backup associated with a manager of the deployment; and
       a second type of backup associated with the manager of the deployment.

14. The non-transitory computer readable medium of claim 13, wherein scheduling the hybrid backup for the deployment comprises:
   scheduling generation of the first type of backup for the managers at a first point in time; and
   scheduling generation of the second type of backup for the managers at a second point in time,
   wherein the second point in time is after the first point in time.

15. The non-transitory computer readable medium of claim 13, wherein the first type of backup is a full backup.

16. The non-transitory computer readable medium of claim 13, wherein the second type of backup is an incremental backup.

17. The non-transitory computer readable medium of claim 13, wherein the first type of backup is based on all data of the deployment.

* * * * *

UNITED STATES PATENT AND TRADEMARK OFFICE
CERTIFICATE OF CORRECTION

| | |
|---|---|
| PATENT NO. | : 11,281,542 B2 |
| APPLICATION NO. | : 16/656982 |
| DATED | : March 22, 2022 |
| INVENTOR(S) | : Sengupta et al. |

It is certified that error appears in the above-identified patent and that said Letters Patent is hereby corrected as shown below:

In the Claims

In Claim 10, Column 16, Line 29, the phrase "The method of claim 7, wherein the second e of" should read "The method of claim 7, wherein the second type of".

In Claim 12, Column 16, Line 33, the phrase "The method of claim 7, wherein the second e of" should read "The method of claim 7, wherein the second type of".

Signed and Sealed this
Thirty-first Day of May, 2022

Katherine Kelly Vidal
*Director of the United States Patent and Trademark Office*